US010242330B2

(12) United States Patent
Daya et al.

(10) Patent No.: US 10,242,330 B2
(45) Date of Patent: Mar. 26, 2019

(54) METHOD AND APPARATUS FOR DETECTION AND ANALYSIS OF FIRST CONTACT RESOLUTION FAILURES

(71) Applicant: NICE-SYSTEMS LTD, Ra'anana (IL)

(72) Inventors: Ezra Daya, Petah Tikva (IL); Eyal Hurvitz, Ramat Gan (IL)

(73) Assignee: NICE-SYSTEMS LTD, Ra'anana (IL)

( * ) Notice: Subject to any disclaimer, the term of this patent is extended or adjusted under 35 U.S.C. 154(b) by 490 days.

(21) Appl. No.: 13/669,467

(22) Filed: Nov. 6, 2012

(65) Prior Publication Data
US 2014/0129299 A1 May 8, 2014

(51) Int. Cl.
*G06Q 10/06* (2012.01)

(52) U.S. Cl.
CPC ......... *G06Q 10/06* (2013.01); *G06Q 10/0633* (2013.01); *G06Q 10/0639* (2013.01); *G06Q 10/06393* (2013.01); *G06Q 10/06395* (2013.01)

(58) Field of Classification Search
CPC .............. G06Q 10/06; G06Q 10/0639; G06Q 10/06393; G06Q 10/06395; G06Q 10/0633
USPC .............................. 705/7.11, 7.12, 7.32, 7.41
See application file for complete search history.

(56) References Cited

U.S. PATENT DOCUMENTS

| | | | | |
|---|---|---|---|---|
| 6,173,261 B1 * | 1/2001 | Arai | ...................... | G06F 17/274 704/231 |
| 7,466,334 B1 * | 12/2008 | Baba | ........................ | 348/14.06 |
| 7,873,156 B1 * | 1/2011 | Blair | ........................ | 379/265.06 |
| 8,321,220 B1 * | 11/2012 | Chotimongkol | ...... | G10L 15/063 704/10 |
| 8,379,830 B1 * | 2/2013 | Naik | ...................... | H04M 3/493 379/265.02 |
| 8,385,532 B1 * | 2/2013 | Geist et al. | .............. | 379/265.03 |
| 2004/0162742 A1 * | 8/2004 | Stoker | .................... | G06Q 10/06 707/758 |
| 2006/0233325 A1 * | 10/2006 | Wu | ...................... | G06F 17/2735 379/88.13 |
| 2008/0181417 A1 * | 7/2008 | Pereg et al. | .................... | 381/17 |
| 2008/0189171 A1 * | 8/2008 | Wasserblat et al. | ............ | 705/11 |
| 2010/0104086 A1 * | 4/2010 | Park | ........................ | 379/265.09 |
| 2010/0104087 A1 * | 4/2010 | Byrd | ................. | H04M 3/42221 379/265.09 |

(Continued)

OTHER PUBLICATIONS

Routing to Manage Resolution and Waiting Time in Call Centers with Heterogeneous Servers, Vijay Mehrotra et al., University of San Francisco—San Francisco, CA, pp. 1-35 (Year: 2009).*

*Primary Examiner* — Timothy Padot
*Assistant Examiner* — Darlene Garcia-Guerra
(74) *Attorney, Agent, or Firm* — Soroker Agmon Nordman (57) ABSTRACT

The subject matter discloses a method for detection and analysis of first contact resolution failures comprising: obtaining a first plurality of digital representations, each digital representation of the first plurality is associated with a contact center interaction; determining a pair of digital representations that represent a pair of contact center interactions determined from the first plurality of digital representations according to metadata associated with the pair of contact center interactions; determining topics of each interaction of the determined pair of contact center interactions represented by the pair of digital representations; classifying the pair of contact center interactions as first contact resolution failure or first contact resolution interactions pair.

21 Claims, 5 Drawing Sheets

(56) References Cited

U.S. PATENT DOCUMENTS

| | | | |
|---|---|---|---|
| 2010/0138377 A1* | 6/2010 | Wright | G06F 17/30516 |
| | | | 706/52 |
| 2010/0142698 A1* | 6/2010 | Spottiswoode | H04M 3/5232 |
| | | | 379/265.11 |
| 2010/0158236 A1* | 6/2010 | Chang et al. | 379/265.03 |
| 2010/0274637 A1* | 10/2010 | Li et al. | 705/11 |
| 2010/0332477 A1* | 12/2010 | Jeffs et al. | 707/738 |
| 2011/0010173 A1* | 1/2011 | Scott et al. | 704/235 |
| 2011/0307257 A1* | 12/2011 | Pereg | G06Q 10/063 |
| | | | 704/251 |
| 2012/0130771 A1* | 5/2012 | Kannan et al. | 705/7.32 |
| 2012/0137367 A1* | 5/2012 | Dupont | G06F 21/00 |
| | | | 726/25 |
| 2013/0136253 A1* | 5/2013 | Liberman Ben-Ami et al. | |
| | | | 379/265.09 |

* cited by examiner

| | TOPIC 1 | TOPIC 2 | ...... | TOPIC N |
|---|---|---|---|---|
| TOPIC WEIGHT SCORE | [420] 0.23 | [422] 0.11 | ...... | [424] 0.01 |
| KP1, KP1-WEIGHT | [430] KP11, 0.36 | [440] KP21, 0.58 | ...... | [450] KPN1, 0.36 |
| KP2, KP2-WEIGHT | [432] KP12, 0.21 | [442] KP22, 0.35 | ...... | [452] KPN2, 0.21 |
| KP3, KP3-WEIGHT | [434] KP13, 0.18 | [444] KP23, 0.29 | ...... | [454] KPN3, 0.18 |
| . | . | . | | . |
| . | . | . | | . |
| . | . | . | | . |
| KPN, KPM-WEIGHT | [436] KP1M, 0.03 | [446] KP2M, 0.07 | ...... | [456] KPNM, 0.03 |

FIG. 4A

| TOPICS: | TOPIC 1 | TOPIC 2 | TOPIC 3 | ...... | TOPIC N |
|---|---|---|---|---|---|
| TOPIC WEIGHTS: | 0.23 | 0.11 | 0.08 | ...... | 0.01 |

METHOD AND APPARATUS FOR DETECTION AND ANALYSIS OF FIRST CONTACT RESOLUTION FAILURES

FIELD OF THE INVENTION

The present invention relates to interaction analysis in general, and to a method and apparatus for detection and analysis of first contact resolution failures, in particular.

BACKGROUND

Large organizations, such as commercial organizations, financial organizations or public safety organizations conduct numerous audio and textual interactions with customers, users, suppliers or other persons on a daily basis. Some of these interactions are vocal, or at least comprise a vocal component, such as an audio part of a video or face-to-face interaction; and some of these interactions are textual, such as emails, chat sessions, instant messaging sessions, or social media correspondence.

Many organizations record some or all of the interactions, whether it is required by law or regulations, for business intelligence, for quality assurance or quality management purposes, or for any other reason.

Once the interactions are recorded, the organization may want to extract as much information as possible from the interactions. The information is extracted and analyzed in order to enhance the organization's performance and achieve their business objectives. Two major objectives of business organizations that provide service are customer satisfaction and operational efficiency. First Contact Resolution (FCR). That is, resolving the issue, raised by the customer, in not more than one contact, is a key performance indicator of customer satisfaction. Furthermore, First Contact Resolution Failure (FCRF) accounts for a significant portion of the redundant operational costs of contact centers.

Automated systems activate multiple tools as part of the information extraction and analysis. Such tools may include speech recognition tools such as automatic transcription, word spotting, or text analysis tools such as text classification, sentiment analysis or the like.

However, even if full and accurate analysis is available, there is still a major unanswered question: how can first contact resolution failures be automatically detected and analyzed.

There is thus a need in the art for method and apparatus for detection and analysis of first contact resolution failures. Such analysis will enable monitoring and enhancement of the first contact resolution rate business objective.

SUMMARY OF THE INVENTION

A major objective of business organizations is to decrease the amount of First Contact Resolution Failures (FCRF). In order to do so, there is a need first to detect and analyze FCRF. Current methods for FCRF detection are based on Information Extraction methods. Those methods are based on extracting clues from the interaction that indicate FCRF by using, patterns. The patterns are designed to detect events in which a customer explicitly states that the current contact is not the first one concerning the current contact issue. Following are examples for resolution failure clues:

"Not the first time I called"
"I already called you last time about this"
"I'm calling again about . . . "

Such information extraction methods are heavily based on lexicons and have some major drawbacks. Those methods are prone to precision errors; for example, a customer stating "I already called . . . " may refer to a different calling action which does not imply that the customer already called the organization regarding the current issue. In addition, such information extraction methods yield low recall since in many cases, there is no implicit statement by the customer or the organization representative regarding resolution failure. Moreover, when dealing with automatically transcribed telephone calls that include significant transcription error rates pattern-based techniques precision and recall performance is degraded even more. Therefore, detecting FCRF involves deeper semantic considerations that often cannot be resolved using lexicons based information extraction.

An aspect of an embodiment of the disclosed subject matter, relates to automatic system and method for detecting and analyzing first contact resolution failures. The system is based on interaction topic modeling. Topic modeling provides the required semantic depth on one hand and the robustness for noisy textual data environments on the other hand. On top of the topic modeling component, the system of the subject matter includes a model based classification component in order to classify a pair of interactions to one of the two classes: FCRF or FCR.

The model based classification is based on parameters such as the distance between topics that are discussed in the pair of interactions. The model based classification is also based on parameters such as the identity of the common topics that appear in the pair of interactions and external data that is associated with the pair of interactions, such as: interactions date and time difference, the customer identity in both interactions, etc.

The classification model is pre-trained by using a collection of tagged pairs of interactions. Each pair of interactions is manually or automatically tagged as FCRF pair of interactions or FCR pair of interactions. The above parameters extracted from the tagged pairs along with external data and the pair tags are fed into a model generation component producing an FCR model.

BRIEF DESCRIPTION OF THE DRAWINGS

The present disclosure will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
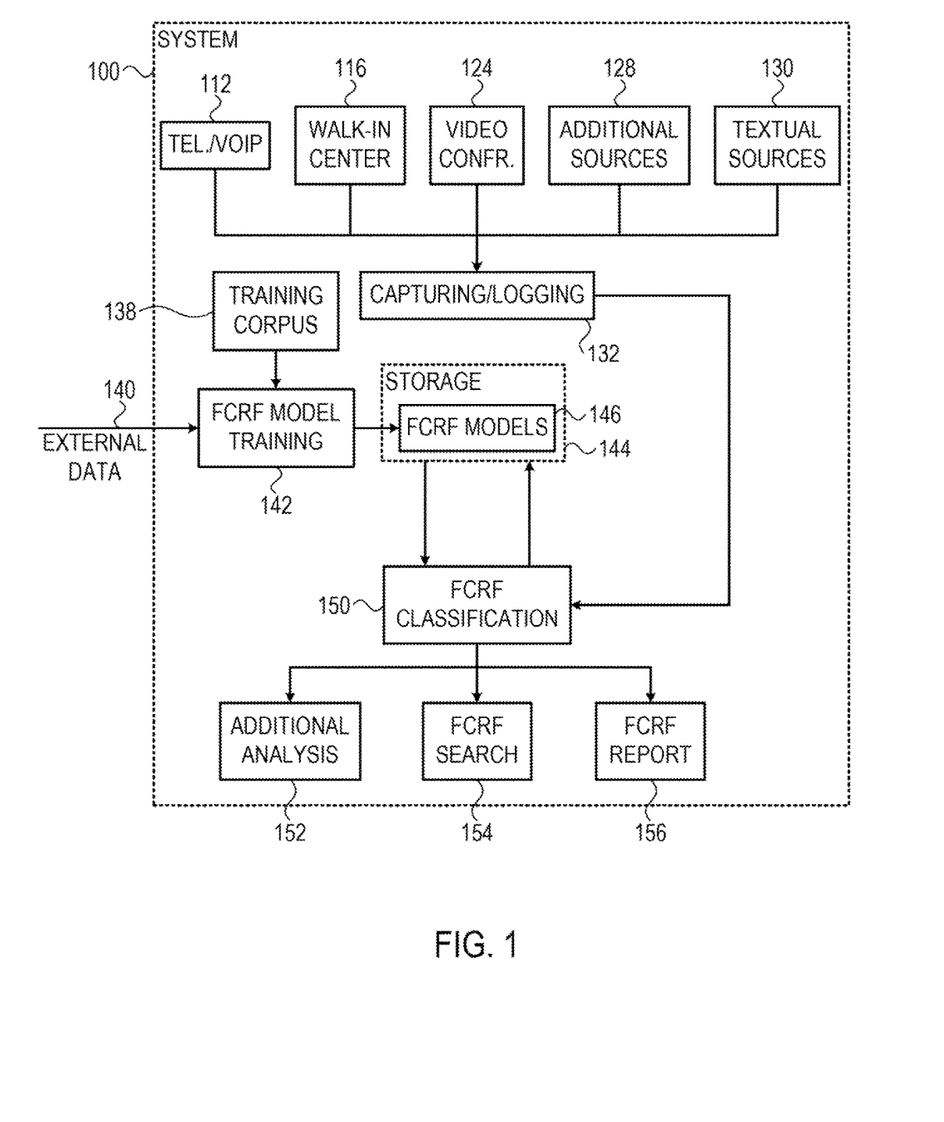
FIG. 1 shows a typical environment in which the disclosed method is used, according to exemplary embodiments of the disclosed subject matter.

Reference is made to FIG. 1 which shows a system 100 which is an exemplary block diagram of the main components in a typical environment in which the disclosed method is used, according to exemplary embodiments of the disclosed subject matter.

As shown, the system 100 may include a capturing and/or logging module 132 that may receive input from various sources as shown by telephone/VoIP 112, walk-in center 116, video conference 124, additional sources 128 or textual sources 130. It will be understood that capturing and logging module 132 may receive any digital input produced by any component or system, e.g., any recording or capturing device. For example, any one of a microphone, a computer telephony integration (CTI) system, a private branch exchange (PBX), a private automatic branch exchange (PABX), an email server system, a chat server system, a social media capture system or the like may be used in order to capture audio signals or textual data.

As further shown, the system may include a training corpus unit 138, an FCRF model training component 142, a storage device 144 that stores FCRF models 146. It also includes an FCRF classification component 150. As shown, the output of the system may be provided to an additional analysis module 152 and/or to FCRF search module 154 and/or to an FCRF report module 156.

A typical environment where a system according to the invention ma be deployed may be an interaction-rich organization, e.g., a contact center, a bank, is trading floor, an insurance company or any applicable financial or other institute. Other environments may be a public safety contact center, an interception center of a law enforcement organization, a service provider, or the like. Interactions captured and provided to system 100 may be any applicable interactions or transmissions, including broadcasts, interactions with customers or users or interactions involving organization members, suppliers or other parties.

Various data types may be provided as input to system 100. The information types optionally include auditory segments, video segments, textual segments, and additional data. The capturing of voice interactions, or the vocal or auditory pan of other interactions, such as video, may be of any form, format, and may be produced using various technologies, including trunk side, extension side, summed audio, separate audio, various encoding and decoding protocols such as G729, G726, G723.1, and the like.

The interactions may be provided by modules 112, 116, 124, 128 and 130 and captured by capturing/logging module 132. Vocal interactions may include telephone or voice over IP (VoIP) sessions, telephone calls of any kind that may be carried over landline, mobile, satellite phone or other technologies.

It will be appreciated that voice messages are optionally captured and processed as well, and that embodiments of the disclosed subject matter are not limited to two-sided conversations. Captured interactions may include face to-face interactions, such as those recorded in a walk-in-center, video conferences that include an audio component or any additional sources of data as shown by 128. Additional sources 128 may include vocal sources such as microphone, intercom, vocal input by external systems, broadcasts, files, streams, or any other source. Textual sources 130 may include sources such as e-mails, chat sessions, instant messaging sessions, social media sessions, facsimiles which may be processed by, for example, Object Character Recognition (OCR) systems and the like.

Data from all the above-mentioned sources and others may be captured and/or logged by capturing/logging module 132. Capturing/logging module 132 may include a computing platform that may execute one or more computer applications, e.g., as detailed below. The captured data may optionally be stored in storage which is preferably a mass storage device, for example an optical storage device such as a CD, a DVD, or a laser disk; a magnetic storage device such as a tape, a hard disk, Storage Area Network (SAN), a Network Attached Storage (NAS), or others; a semiconductor storage device such as Flash device, memory stick, or the like.

The storage may be common or separate for different types of captured segments of an interaction and different types of additional data. The storage may be located onsite where the segments or some of them are captured, or in a remote location. The capturing or the storage components can serve one or more sites of a multi-site organization. Storage device 144 may store FCRF models 146, FCRF classification results of pairs of interactions, topic vectors of interactions, or other data as detailed below and may be used in run-time for real time sales optimization.

In an embodiment, training corpus unit 138 may consist of a collection of digital representations of audio interactions and/or textual interactions that were captured by capturing/logging module 132. A typical corpus size may be for example, hundreds of interactions of average length of a few minutes per interaction and or hundreds of textual interactions of average length of a few hundred words per interaction.

External data storage 140 may include structured information that is associated with each audio interaction or textual interaction. The structured information may include fields such as: interaction ID which is an interaction unique identifier, interaction date and time, interaction duration, customer ID which is a unique identifier of the customer party of the interaction, etc.

FCRF model training component 142 may use pairs of interaction from training corpus unit 138 and parameters associated with the pairs of interactions from external data storage 140 in order to generate an FCRF model. The FCRF model may include any representation of the distance between parameters of pairs of interactions that are tagged as FCRF pairs of interactions and parameters of pairs of interactions that are tagged as FCR pairs of interactions.

FCRF classification component module 150 may produce a classification decision regarding a pair of interactions. The pair of interactions is classified to one of the two classes: FCRF pair of interactions or FCR pair of interactions. In addition to the classification decision, FCRF classification module produces also an FCRF classification score. This score represents the probability that a customer issue was not resolved within one interaction and handling of the same customer issue continued in an additional interaction.

Classification is performed based on FCRF models 146 that are trained by FCRF model training component 142.

The output of the FCRF classification component 150 may be transferred to the additional analysis component 152. The additional analysis component 152 may include categorization components that can use FCRF classification results as categorization criteria. For instance, the categorization criteria can filter interactions that were classified as FCRF in addition to other filters such as detected words or phrases or interaction metadata such as capturing date and time, contact duration or the like.

The output of the FCRF classification component 150 may also be transferred to FCRF search module 154. This module enables searching for interactions or pairs of interactions that were classified as FCRF pairs of interactions or classified as FCR pairs of interactions. In addition the module enables searching for sequences of interactions based on their associated FCR scores. The user may be able to search and filter FCRF pairs of interactions or sequences of interactions according to parameters such as: FCRF classification score, interaction capturing date and time, interaction duration, or the like. When populated, the search results may be displayed and sorted in a descending order according to the relevancy to the search query. The relevancy may include the FCRF classification score.

The output of the FCRF classification component 150 is optionally transferred to the FCRF report component 156. This module generates an on demand or a timely report that includes a list of pair of interactions that were classified as FCRF pairs of interactions. The list is preferably sorted in a descending order from the highest FCRF classification score to the lowest. In addition the report may show a list of sequences of interactions and their associated FCR scores.

Browsing through such report may be useful for organization representatives training or for FCRF root cause analysis. The report parameters such as the date and time interval, list size, maximum and/or minimum FCRF classification scores, etc. are configurable by the user.

System 100 may include one or more computing platform, executing components for carrying out the disclosed steps. System 100 may be or may include a general purpose computer such as a personal computer, a mainframe computer, or any other type of computing platform that may be provisioned with a memory device (not shown), a CPU or microprocessor device, and several I/O ports (not shown).

System 100 may include one or more collections of computer instructions, such as libraries, executables, modules, or the like, programmed in any programming language such as C, C++, Java or other programming languages, and/or developed under any development environment, such as .Net, J2EE or others.

Alternatively, methods described herein may be implemented as firmware ported for a specific processor such as digital signal processor (DSP) or microcontrollers, or may be implemented as hardware or configurable hardware such as field programmable gate array (FPGA) or application specific integrated circuit (ASIC). The software components may be executed on one platform or on multiple platforms wherein data may be transferred from one computing platform to another via a communication channel, such as the Internet, Intranet, Local area network (LAN), wide area network (WAN), or via a device such as CD-ROM, disk on key, portable disk or others.

Figure 2:
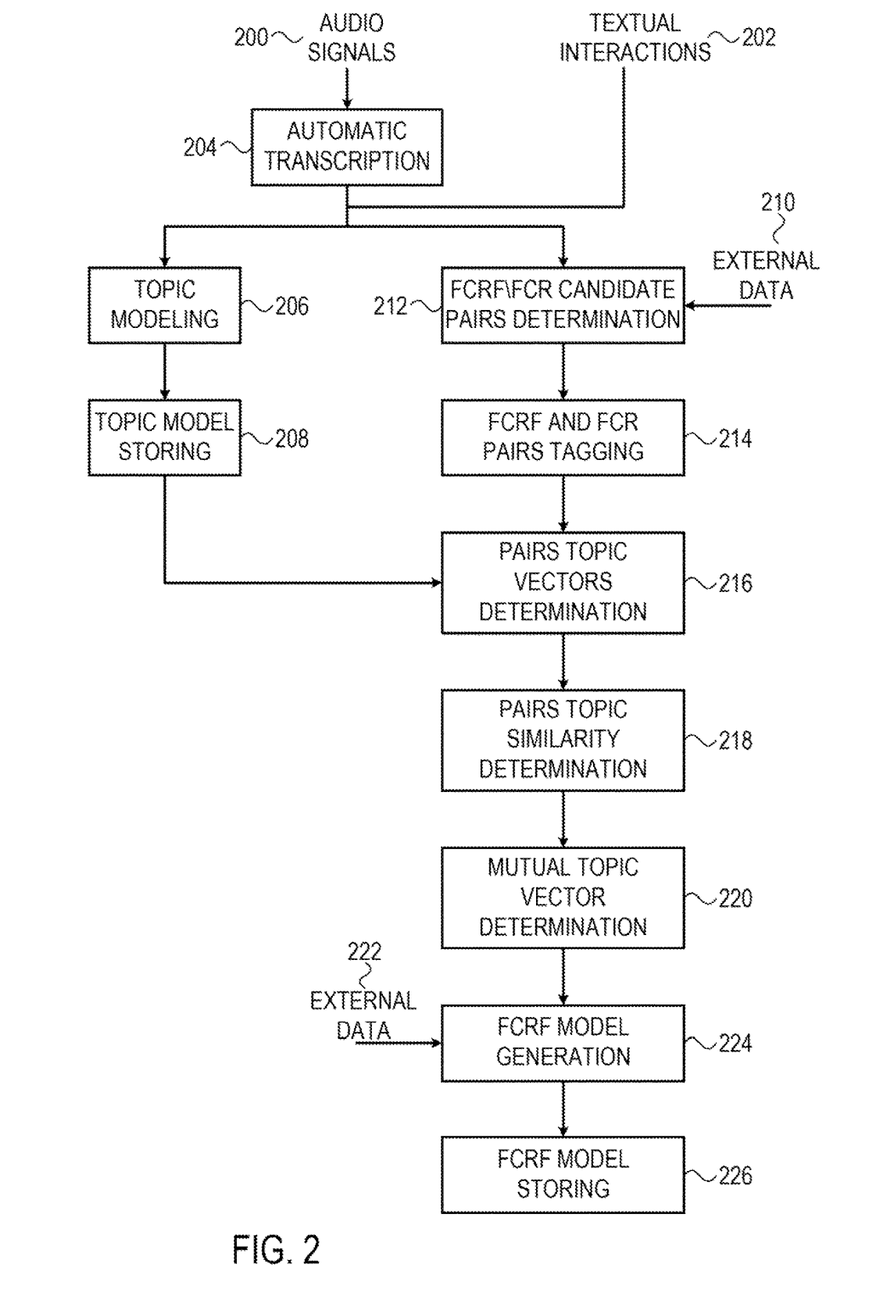
FIG. 2 shows a method for FCRF model generation in which the disclosed method is used, according to exemplary embodiments of the disclosed subject matter.

Reference is made to FIG. 2 which shows an exemplary method according to embodiments of the disclosed subject matter. The method described herein with reference to FIG. 2 may be used for FCRF model generation.

Audio signals 200 are collection of digital representations of audio interactions, each representation is associated with a specific contact center interaction that was captured by the capturing/logging module 132 of FIG. 1. A typical collection size may be for example, hundreds of interactions of average length of a few minutes per interaction.

Textual interactions 202 are a collection of textual contact center interactions that were captured by the capturing/logging module 132 of FIG. 1. Textual interactions may be of the types: email, chat, instant messaging session, or social media correspondence. A typical collection size may be for example, hundreds of interactions of average length of a few hundred words per interaction.

Step 204 discloses automatically transcribing each digital representation of audio interaction into a textual transcript by a speech to text algorithm, for example, by an LVCSR algorithm.

Step 206 discloses performing topic modeling by applying a topic detection algorithm on the transcribed audio interactions and/or the textual interactions in order to detect the different topics conveyed in the interactions collection. According to embodiments of the invention, each topic may have a topic weight score that reflects its distribution level in the collection of transcribed audio interactions and/or textual interactions. Each topic may also include a set of key-phrases. The key-phrases are words or phrases associated with or related to its certain theme or subject. Each of the key-phrases that are associated with a topic may be scored according to its importance and relevancy for that certain topic. The output of the topic modeling step are a plurality of weight scores, where each weight score is associated with a topic and a plurality of sets, where each set is associated with a topic. Each of the plurality of sets may include a list of key-phrases and each of the key-phrases may have a score. The output of this step will be referred to herein as topic model.

Step 208 discloses topic model storing. The topic model is stored in any permanent storage, such as FCRF models 146 of the storage device 144 of FIG. 1.

External data 210 includes structured information that is associated with each audio interaction or textual interaction. The structured information may include fields such as: interaction date and time, interaction duration, customer ID which is a unique identifier of the customer party of the interaction, etc.

Step 212 discloses FCRF\FCR candidate pairs determination. FCRF and FCR plurality of candidate pairs of contact center interactions are detected by using the obtained external data 210. Interactions may be paired forming candidate pairs of interactions by applying predefined rules on their associated external data. For example, in some embodiments, two interactions may be associated together forming a candidate pair of interactions in case that their customer ID field is similar and their interaction date difference is not larger than a predefined number of days. In other words, two interactions that share the same participating customer and are performed within a short time interval are associated forming an FCRF\FCR candidate pair of interactions. Each candidate pair of interactions include two interactions, a first interaction and a second interaction, the first interaction having an older capturing date than the second interaction.

Step 214 discloses FCRF and FCR pairs tagging. In this step each candidate pair of interactions type is tagged as FCRF or FCR pair of interactions. The tagging may be based on human subjective judgment. A human tagger may listen to the audio interactions or read the textual interactions. The tagger may decide to tag a candidate pair of interactions as an FCRF pair upon evidencing expressions that represent a situation where the customer issue was not resolved within the first interaction and the same issue arises again in the second interaction. In case that the tagger evidences expressions for issue resolution within the first interaction then the candidate pair of interactions is tagged as an FCR pair.

Alternatively FCRF and FCR pairs tagging may be performed automatically. Automatic detection of FCRF and FCR pairs may be performed using pattern-based information extraction. The patterns are pre-defined and designed to detect FCRF expressions and FCR expressions. The patterns are based on predefined lists of words and/or phrases and logical operators. The patterns may use a list of words and/or phrases that imply issue resolution such as "solution", "solve", etc. The patterns may also use a list of words and/or phrases that imply negation such as: "did not", "not", "no", etc. following is an example for a pattern that is designed to detect FCRF expressions: Wnegate NEAR(5) Wsolve, where: Wnegate is a list of words and/or phrases that imply negation, Wsolve is a list of words and/or phrases that imply issue resolution and NEAR(m) is a truth value operator. It produces a "true" value in case that its arguments are true within the range of m ordinal positions; else it produces a "false" value. That is, the expression is true if at least one word or phrase from each list is found not farer than m words apart. Candidate pair of interactions may be automatically tagged as FCRF pair upon detecting FCRF expressions in the first interaction and in the second interaction. A candidate pair of interactions may be automatically tagged as FCR pair upon detecting FCR expressions in the first interaction and in the second interaction.

Step 216 discloses topic vectors determination. In this step a topic vector is determined for each interaction belonging to an FCRF pair or an FCR pair. A topic vector is a vector of weight scores, where each weight score is associated with a different topic. The weight scores may represent the probability distribution, thus conveying the relative portion of each topic m the interaction. One topic vector is generated for each interaction by determining the topic weights for the interaction based on the interaction transcription and the obtained topic model that is formed on step 206 and stored on step 208. In some embodiments, each topic weight is determined by determining a distance, such as Euclidean distance from the interaction transcription and the topic set which is a part of the topic model. The topic set may be a list of key-phrases and their scores that are associated with the topic.

Step 218 discloses topic similarity determination. In general, topic similarity may measure the extent to which the topics conveyed in a document are similar to the topics conveyed in another document or a set of documents. Each of the FCRF and FCR pairs of interactions may be ranked or scored. The ranking or scoring of a pair of interactions is based on the topic similarity between the first interaction and the second interaction that constitute the pair of interactions. Topic similarity may be measured by a predetermined topic similarity formula. It may produce a score based on the differences between the topic vectors determined on step 216. The following similarity function is an exemplary function; other functions like the Kullback-Leibler divergence function for example may also be used:

$$TopicSim(Pair_i) = \left| \frac{T_i^A * T_i^B}{\|T_i^A\| * \|T_i^B\|} \right|$$

Where:
I represents the i-th FCRF or FCR pair of interactions;
$T_i^A$ represents the topic vector of the first interaction of the i-th pair of interactions;
$T_i^B$ represents the topic vector of the second interaction of the i-th pair of interactions;

Step 220 discloses mutual topic vector determination. At this step a mutual topic vector is determined for each of the FCRF and FCR pairs of interactions. In general the mutual topic vector may reflect the topics that are conveyed in both the first and the second interaction of the FCRF pair or the FCR pair. For example, in some embodiments, the following function may be used for mutual topic vector determination:

$$MutualVec_i = (clip(T_i^A, Th))$$

AND $$(clip(T_i^B, Th))$$

$$clip(X, Th) = \begin{cases} x_j = 1 & \text{if}(x_j > Th) \\ x_j = 0 & \text{otherwise} \end{cases}$$

Where:
i represents the i-th FCRF or FCR pair of interactions;
$T_i^A$ represents the topic vector of the first interaction of the i-th pair of interactions;
$T_i^B$ represents the topic vector of the second interaction of the i-th pair of interactions;
$x_j$ represents the j-th entry of vector X;
Th represents a predefined threshold; and
AND represents a bitwise AND operation;

Step 224 discloses FCR model generation. At this step a plurality of training vectors are produced. Each training vector is produced by conjoining the determined parameters of an FCRF/FCR pair of interactions. The determined pair of interactions parameters may include:
  The topic similarity of each pair determined on step 218
  The mutual topic vector of each pair determined on step 220
  Etc.

In addition to the determined parameters obtained, parameters from external data 222 regarding each pair of interactions are also added to the training vector. The obtained parameters may include information regarding the pair of interactions such as:
  The capturing time difference between the second and first interaction of the pair of interactions
  The agent ID of the first and second interaction of the pair of interactions. The agent ID is a unique identifier of the organization representative party of the interaction.
  The channel type of each interaction, i.e. telephone call, email, chat, social media correspondence, etc.
  The IVR thread of the first and second interaction of the pair of interactions
  Etc.

Following is as example of a generated training vector structure: TV(n)={[TS(n), MV(n), ED(n)]}. Wherein n represents the n-th pair of interactions, TS (n) represents the topic similarity of the n-th pair. MV(n) represents the mutual vector of the n-th pair and ED(n) represents the external data obtained for the n-th pair. Each training vector TV(U) is associated with label T(n). Tag T(n) reflects the pair of interactions tagging as FCRF pair or FCR pair performed on step 214.

Further at FCR model generation step, a model is trained using the training vectors TV(n) and their associated tags T(n). Training is preferably performed using methods such as Neural networks or Support Vector Machines (SVM). Assuming, for example, the usage of a linear classification method such as SVM. Further assuming that the classifier operates in a binary class environment—where T(n) belongs to one of the two classes, the "FCRF pair" class or the "FCR pair" class. In this case the training process aims to produce a linear separation between the two classes using the TV(n) vectors. In the case of SVM the main training, process includes the selection of TV(n) vectors that are close to the separation hyper plane. Those vectors are called support vectors. The output of the training process, and of this step, is a parametric model which includes the support vectors. The parametric model is referred to in this embodiment as FCRF model.

Step 226 discloses FCRF model storing. At this step the model is stored in any permanent storage, such as the storage device 144 of FIG. 1.

Figure 3:
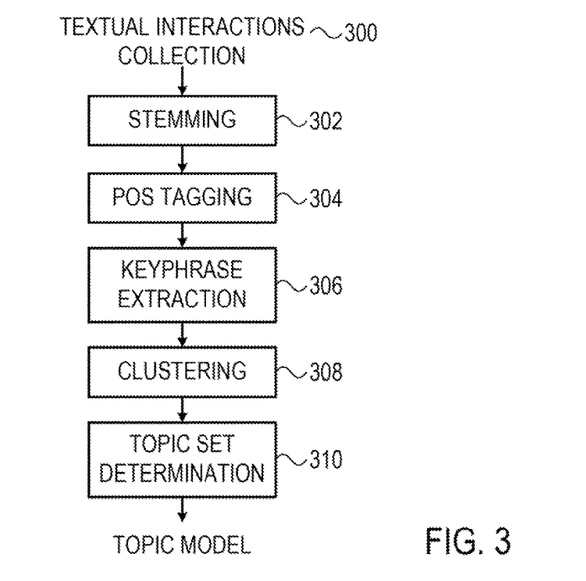
FIG. 3 shows a method for topic modeling in which the disclosed method is used, according to exemplary embodiments of the disclosed subject matter.

Reference is made to FIG. 3, which shows an exemplary method according to embodiments of the disclosed subject matter. The method described herein with reference to FIG. 3 may be used for topic modeling process indicated at step 206 of FIG. 2.

Step 302 discloses stemming of the textual interactions collection 300. Stemming is performed, namely, reducing inflected or derived words to their stem, base or root form, generally a written word form, for example, detecting the base form of each word, typically a singular and present form.

Step 304 discloses Part Of Speech (PUS) tagging of textual interactions collection 300. The POS tagging may be performed based on the definition as well as on the context of words detected in the interaction, and may serve for reducing ambiguity of words within the context. The tags may include a verb, a noun (singular), a noun (plural), a pronoun, a preposition, an adverb, an adjective, and the like. It should be understood to a person skilled in the art that the steps and operations indicated at steps 302 and 304 may be performed using proprietary tools, or any other external or commercial tools, such as LinguistxPlatform™ manufactured by SAP.

Step 306 discloses key-phrase extraction from textual interactions collection 300. At this step words or phrases may be extracted from the tagged texts generated at box 304. For example the textual interactions may be segmented to non-overlapping or overlapping sequences of N consecutive words. The sequence is typically in the range of two to five. This sequence is referred to herein as key-phrase. In addition, other features may be extracted from the tagged textual interactions. The features may include a list of key phrase appearances number in the interaction, referred to herein as "key phrase frequencies".

Step 308 discloses clustering of the textual interactions collection. At this step document level clustering may be performed. The document level clustering process may include clustering interactions into clusters. Each of the clusters may represent a different topic uttered in the collection of the textual interactions. The clustering process also produces a plurality of weight scores; each weight score is associated with a topic representing the weight of the topic in the collection of textual interactions. The clustering method is preferably but not limited to K-means clustering. Other clustering methods or clustering analyses such as hierarchical clustering may be used.

Step 310 discloses topic set determination. At this a plurality of sets of key-phrases are extracted. Each set of key-phrases is associated with a different topic. The key phrases are preferably extracted using Z-score method. The key phrases may also be extracted by TF-IDF or other method. Those methods also associate a score for each key-phrase representing the importance and relevancy of this key-phrase for a certain topic. The weights that are associated with the topics extracted on step 308 along with the plurality of sets of key-phrases and their associated scores are referenced herein as topic model.

Figure 4A:
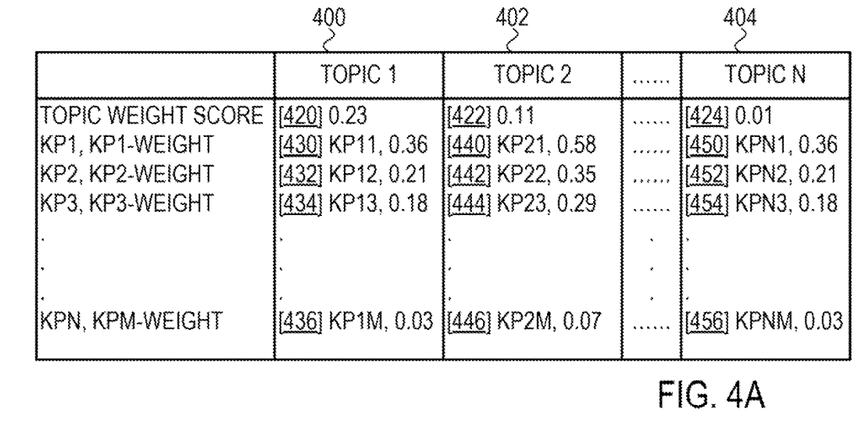
FIG. 4A is an exemplary illustration of topic model data structure according to embodiments of the disclosed subject matter.

Referring now to FIG. 4A, illustrating a topic model data structure that may be generated on step 206 and stored on step 208 of FIG. 2. Each of the fields 400-404 may indicate a different topic that is detected in the collection of transcribed audio interactions and or textual interactions. Fields 420-424 may be the associated topic weights of topics 400-404. For example, topic weight score field 420 indicates that the weight of topic number 1 is 0.23. The topic weights may add up to 1, resembling a probability distribution, thus showing the relative portion of each topic in the interaction. The topic model data structure may also include key-phrase and key-phrase scores fields 430-436 which is a set of key-phrases that are associated with topic number 1. Each key-phrase having a score that represents the centrality of key-phrase within topic number 1. The topic model data structure may also include key-phrase and key-phrase scores fields 440-446 and key-phrase and key-phrase scores fields 450-456 which are sets of key-phrases having scores that are associated with topic 2 and topic N respectively.

Figure 4B:
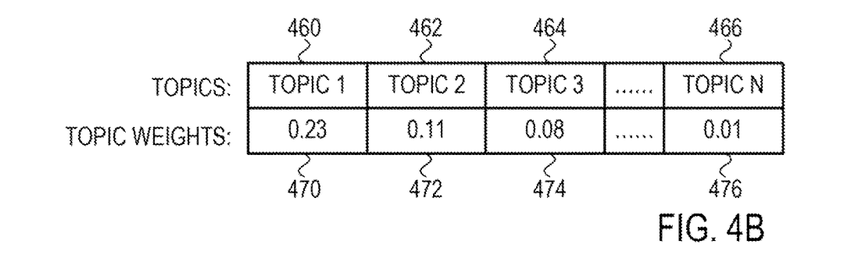
FIG. 4B is an exemplary illustration related to topic vector associated with an interaction according to embodiments of the disclosed subject matter.

Referring now to FIG. 4B, illustrating a topic vector that may be determined for an interaction. A topic vector is determined for an interaction at step 216 of FIG. 2 and at step 312 of FIG. 3.

Each of the topics fields 460-466 may indicate a different topic that is detected in an interaction.

Topic weights fields 470-476 may be the associated topic weights of topics 460-466. For example, topic weight field 470 indicates that the weight of topic 1 is 0.23. The topic weights may add up to 1, resembling a probability distribution, thus showing the relative portion of each topic in the interaction.

Figure 5:
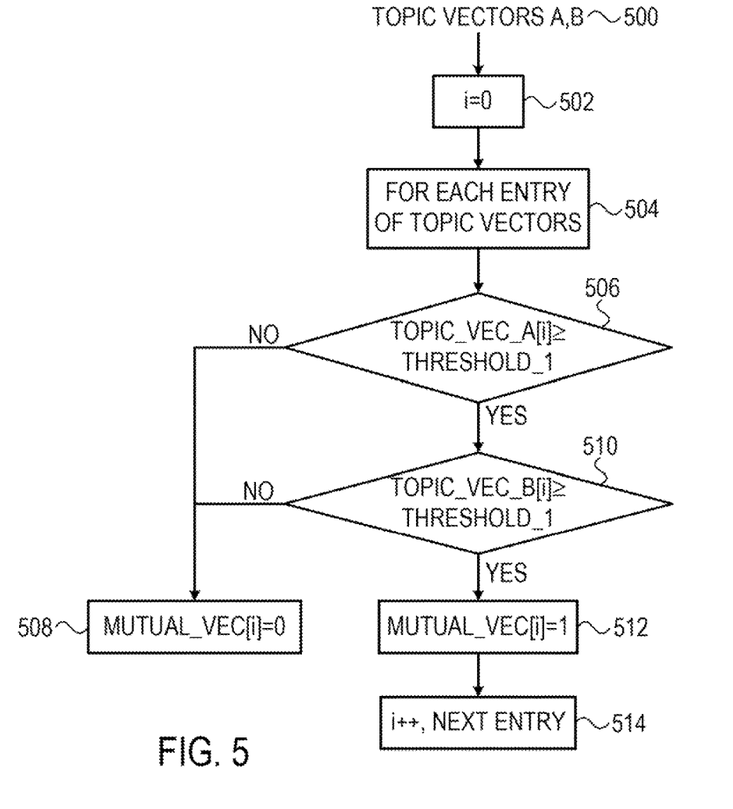
FIG. 5 shows an exemplary method of mutual topic vector determination according to embodiments of the disclosed subject matter.

Reference is made to FIG. 5 which shows an exemplary method of mutual topic vector determination according to embodiments of the disclosed subject matter. FIG. 5 may represent mutual topic vector determination indicated at step 220 of FIG. 2. Similarly it may be determined also at step 716 of FIG. 7.

As indicated at step 501, the vector entry pointer i is zeroed.

As indicated at step 502, the process is performed for each vector entry of topic vector A and of topic vector B, vector A and topic vector B are determined at step 216 of FIG. 2. Similarly they may be determined at step 712 of FIG. 7.

As indicated at step 504 steps 506-512 are performed for every topic vector A and topic vector B entry.

As indicated at step 506, the value of the i-th entry of topic vector A is compared against threshold_1 which is a predefined threshold. If the value of the i-th entry of topic vector A is lower than threshold_1 then, as indicated at step 508, the i-th entry of mutual topic vector is zeroed. If the value of the i-th entry of topic vector A is higher or equal to threshold_1 then, as indicated at step 510, the value of the i-th entry of topic vector B is compared against threshold_1. If the value of the i-th entry of topic vector B is lower than threshold_1 then, as indicated at step 508, the i-th entry of mutual topic vector is zeroed. If the value of the i-th entry of topic vector B is higher or equal to threshold_1 then, as indicated at step 512, the i-th entry of mutual topic vector is set to 1. As indicated in step 514, the vector entry pointer i is incremented and steps 506-512 repeat for every topic vector entry.

Figure 6:
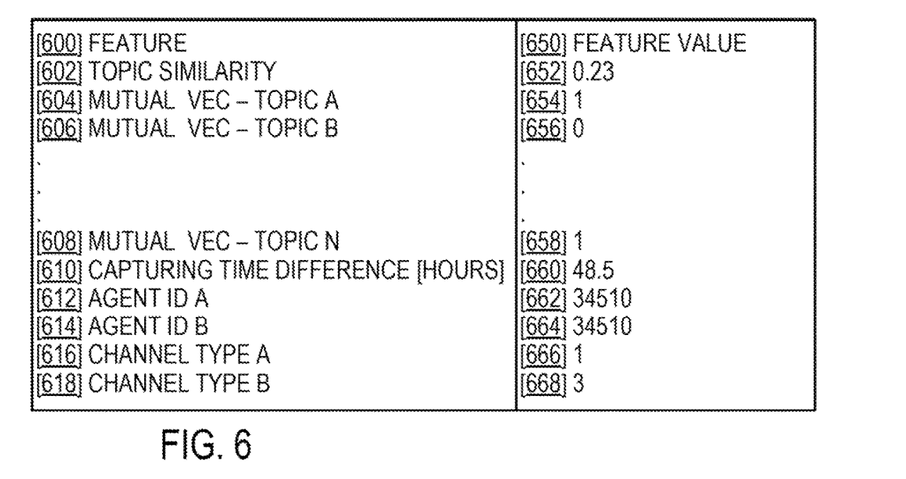
FIG. 6 shows an exemplary illustration of the training vector data structure and the classification vector data structure according to embodiments of the disclosed subject matter.

Reference is now made to FIG. 6 which shows an exemplary illustration of the training vector data structure and the classification vector data structure. The training vector may be generated as part of FCRF model generation step 224 of FIG. 2. The classification vector may be generated as part of FCRF classification step 720 of FIG. 7.

Feature value field 652 represents the topic similarity that may be determined on step 218 of FIG. 2. And on step 714 of FIG. 7. The topic similarity may be a value in the range 0-1. Topic similarity value that is closer to 1 represents high similarity between the topics in the pair of interactions, whereas value that is closer to 0 represents low similarity.

Feature value fields 654-658 represent the mutual vector that may be determined on step 220 of FIG. 2. And on step 716 of FIG. 7. The value of feature value field 654 represent the level of existence of topic A in both interactions; The value of feature value field 656 represent the level of existence of topic B in both interactions; and the value of feature value field 658 represent the level of existence of topic N in both interactions;

For example field 654 is set to 1; therefore represent the existence of topic A in both interactions. Field 656 is set to 0; therefore represent that topic B does not exist in both interactions.

Feature value field 660 represents the capturing time difference in hours between the second and first interaction of the pair of interactions. Feature value field 662 represents the agent ID of the first interaction; feature value field 444 represents the agent ID of the second interaction; feature value field 666 represents the channel type of the first interaction; the channel type may be of the types: telephone call, email, chat, etc. Feature value field 668 represents the channel type of the second interaction.

Figure 7:
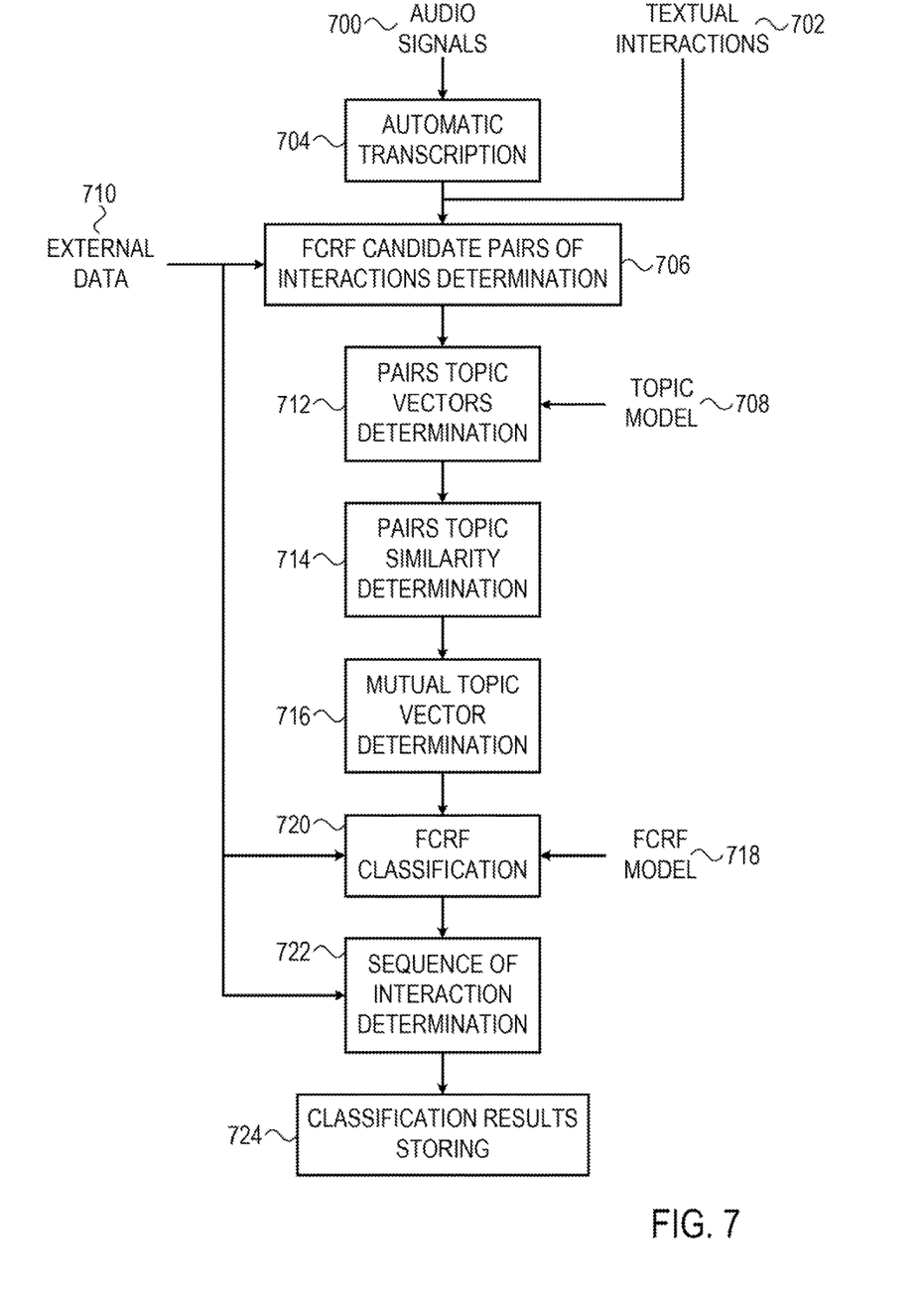
FIG. 7 shows a method for pair of interactions FCRF classification in which the disclosed method is used, according to exemplary embodiments of the disclosed subject matter.

Reference is made to FIG. 7 which shows an exemplary method according to embodiments of the disclosed subject matter. The method described herein with reference to FIG. 7 may be used for pair of interactions FCRF classification and sequence of interactions grouping.

Audio signals 700 are collection of digital representations of audio interactions, each representation is associated with a specific audio interaction that was captured by the capturing/logging module 132 of FIG. 1. A typical collection size may be for example, hundreds of interactions of average length of a few minutes per interaction.

Textual interactions 702 are a collection of textual interactions that were captured by the capturing/logging module 132 of FIG. 1. Textual interactions may be of the types: email, chat, instant messaging session, or social media correspondence. A typical collection size may be for example, hundreds of interactions of average length of a few hundred words per interaction.

Step 704 discloses automatically transcribing each digital representation of audio interaction into a textual transcript by a speech to text algorithm, for example, by an LVCSR algorithm, similarly to step 204 of FIG. 2.

External data 710 includes obtaining structured information that is associated with each audio interaction and or textual interaction. The structured information may include fields such as: interaction date and time, interaction duration, customer ID which is a unique identifier of the customer party of the interaction, etc.

At step 706, the textual transcripts of the audio interactions and textual interactions 702 may undergo FCRF candidate pairs of interactions determination by applying predefined rules on their associated external data 710. At step 712, topic vectors may be determined for each FCRF candidate pair of interactions by using topic model 708. At step 714 topic similarity score is determined for each FCRF candidate pair of interactions. At step 716 mutual topic vector is determined for each FCRF candidate pair of interactions. In general, FCRF candidate pairs of interactions determination step 706, topic vectors determination step 712, topic similarity determination step 714 and mutual topic vector determination step 716 may be respectively similar to FCRF\FCR candidate pairs determination step topic vectors determination step 216 topic similarity determination step 218 and mutual topic vector determination step 220 of FIG. 2.

Step 720 discloses FCRF classification. At this step each of the FCRF candidate pairs of interactions determined on step 706 is classified to one of the two classes: FCRF pair of interactions or FCR pair of interactions. Classification is perform by applying a classification vector on FCRF model 718 that is generated on step 224 and stored on step 226 of FIG. 2. The classification vector is associated with FCRF candidate pair of interactions. The classification vector structure is similar to the training vector structure disclosed at step 224 of FIG. 2. The classification vector is generated by conjoining determined parameters of each of the FCRF candidate pairs of interactions. The determined pair of interactions parameters may include:

The topic similarity of each pair determined on step 714
The mutual topic vector of each pair determined on step 716
Etc.

In addition to the determined parameters, obtained external data 710 regarding each pair of interactions is also added to the classification vector. The obtained data may include pair of interactions parameters such as:

The capturing time difference between the second and first interaction of the pair of interactions
The agent ID of the first and second interaction of the pair of interactions, the agent ID is a unique identifier of the organization representative party of the interaction.
The channel type of each interaction, i.e. telephone call, email, chat, social media correspondence, etc.
The IVR thread of the first and second interaction of the pair of interactions
Etc.

Following is as example of the generated classification vector structure: CV(n)={[TS(n), MV(n), ED(n)]}. Wherein n represents the n-th pair of interactions, TS(n) represents the topic similarity of the n-th pair, MV(n) represents the mutual vector of the n-th pair and ED(n) represents the external data obtained for the n-th pair. Each classification vector CV(n) is classified. Classification is preferably performed using methods such as neural networks or Support Vector Machines (SVM). For example, an SVM classifier may get the classification vector and use the FCRF model 718. The FCRF model may consist of support vectors, which are selected training vectors that were fed to the system along with their class tags during the training phase. Binary classifier may use two classes tagged as "FCRF pair" and "FCR pair". In this step the SVM classifier uses the support vectors that are stored in the FCRF model in order to calculate the distance between the classification vector in its input and the support vectors stored in the model. This distance measure is a scalar in the range of 0-100. This distance measure is referred to herein as FCRF classification score. This score represents the probability that a customer issue was not resolved within the first interaction of the pair of interactions and handling of the same customer issue continued in the second interaction of the pair of interactions. The FCRF classification score is compared to a predefined threshold, e.g. 50, if the FCRF classification score is higher than the predefined threshold then the FCRF candidate pair of interactions is classified as FCRF pair of interactions; else it is classified as FCR pair of interactions.

Step 722 discloses interaction sequence determination. At this iterative step sequences of interactions are formed based on the classified pairs of interactions. First, pairs of the said classified pairs of interactions that share a common interaction ID are grouped together, forming an interactions sequence. Next, each two sequences that share a common interaction ID are grouped together forming a larger interactions sequence. The process repeats until none of the sequences share a common interaction ID. An FCR score is determined for each sequence. In some embodiments the FCR score may be determined by dividing the number of FCR classified pairs of interactions that form the sequence by the total number of pairs of interactions that form the sequence.

Step 724 discloses classification results storing. At this step the classification of each pair of interactions as FCRF or as FCR pair of interactions as well as the FCRF classification score and the interaction ID's that are associated with both interactions are stored in any permanent storage, such as the storage device 144 of FIG. 1. In addition the interaction ID's that are associated with each of the sequence of interactions and their associated FCR scores are also stored in any permanent storage, such as storage device 144 of FIG. 1.

What is claimed is:

1. A method for detecting first contact resolution failures, comprising:
    using a processor, converting audio interactions into textual transcripts and textual interactions or receiving textual transcripts from an e-mail server, chat server or social media server,
    storing in a training corpus the converted or received textual transcripts as pairs of interaction digital representations, each pair is tagged as First Contact Resolution Failure (FCRF) or First Contact Resolution (FCR) interactions pair;
    generating and storing in a storage device a topic model including a plurality of weight scores associated with corresponding key phrases, by detecting topics and corresponding sets of phrases in the interaction digital representations;
    generating and storing in the storage device a First Contact Resolution Failures (FCRF) model by calculating based on the stored topic model a topic similarity score for each of the stored tagged pairs of interactions, and by executing a training module with the topic similarity score and parameters of each of the stored tagged pairs of interactions as input;
    obtaining by a capturing apparatus a first plurality of digital representations, each digital representation of the first plurality is associated with a contact center interaction;
    from the first plurality of digital representations, determining that a first and a second of the plurality of digital representations is a pair of digital representations that represent a pair of contact center interactions according to predefined rules applied on metadata associated with the pair of the contact center interactions, and associating the first and second interactions as candidates for contact resolution classification;
    applying the stored FCRF model for classification of the pair of contact center interactions candidates;
    calculating an FCRF classification score representing the probability that a customer issue was not resolved within the first interaction of the pair of interactions, and handling of the same customer issue continued in the second interaction of the pair of interactions;
    comparing the FCRF classification score to a predefined threshold, thereby classifying the pair of contact center interactions candidates as a first contact resolution failure (FCRF) interaction pair if the FCRF classification score is higher than the predefined threshold or classifying the pair of contact center interactions candidates as a first contact resolution (FCR) interactions pair if the FCRF classification score is lower than the predefined threshold; and
    generating a report including a list of pairs of interactions that were classified as FCRF pairs of interactions;
    wherein the classification of the determined pair of contact center interactions comprises:
    determining based on the stored topic model a topic vector for each digital representation of the determined pair of digital representations; and determining a topic similarity score between the topic vectors associated with the interactions of the determined pair of digital representations.

2. The method according to claim 1, wherein each digital representation of the first plurality represents an audio interaction or a textual interaction.

3. The method according to claim 1, wherein classifying the determined pair of contact center interactions comprises: obtaining external data associated with each digital representation of the determined pair of digital representations.

4. The method according to claim 1, further comprises: grouping classified pairs of interactions of contact center interactions to sequences of interactions; and determining an FCR score for each interaction sequence.

5. The method according to claim 4, further comprises: storing the FCR scores that are associated with the sequences of interactions.

6. The method according to claim 1, further comprises: storing the classification of the pair of contact center interactions.

7. The method according to claim 1, further comprises: enabling a search of the classified pairs of interactions based on the FCRF classification score.

8. The method according to claim 1, further comprises enabling a search of the sequences of interactions based on sequences of interactions FCR scores.

9. The method according to claim 1, further comprises: generating a report based on pairs of interactions and their associated FCRF classification scores.

10. The method according to claim 1, further comprises: generating a report based on sequences of interactions and FCR scores of said sequences of interactions.

11. The method according to claim 1, further comprises obtaining a second plurality of digital representations each digital representation is associated with a contact center interaction;
    determining a topic model for the second plurality of digital representations; determining a pair of digital representations that represent a pair of contact center interactions determined from the second plurality of digital representations according to metadata that is associated with the interactions;

tagging each pair of digital representations; determining topic vectors for each digital representation of the pairs of digital representations;

determining topic similarity scores between each two topic vectors associated with the pairs of digital representations;

determining mutual topic vectors for each digital representation of the pairs of digital representations; and generating an FCRF model based on the topic similarity scores and/or the mutual topic vectors and/or obtained external data that is associated with the interactions.

12. The method according to claim 11, wherein tagging of each pair of digital representations is based on pattern-based information extraction.

13. The method according to claim 1, wherein determining a topic similarity score is determined according to Kullback-Leibler divergence function.

14. A system for detecting first contact resolution failures, comprising:

a storage device configured to store a training corpus of pairs of interaction digital representations, at least one hardware processor configured to execute code, the code comprising instructions for:

converting audio interactions into textual transcripts and textual interactions or receiving textual transcripts from an e-mail server, chat server or social media server;

storing in the training corpus the converted or received textual transcripts as pairs of interaction digital representations, wherein each pair is tagged as First Contact Resolution Failure (FCRF) or First Contact Resolution (FCR) interactions pair;

generating and storing in the storage device a topic model including a plurality of weight scores associated with corresponding key phrases, by detecting topics and corresponding sets of phrases in the interaction digital representations;

generating and storing in the storage device a First Contact Resolution Failures (FCRF) model by calculating based on the stored topic model a topic similarity score for each of the stored tagged pairs of interactions, and by executing a training module with the topic similarity score and parameters of each of the stored tagged pairs of interactions as input;

obtaining by a capturing apparatus a first plurality of digital representations, each digital representation of the first plurality is associated with a contact center interaction;

from the first plurality of digital representations, determining that a first and a second of the plurality of digital representations is a pair of digital representations that represent a pair of contact center interactions according to predefined rules applied on metadata associated with the pair of the contact center interactions, and associating the first and second interactions as candidates for contact resolution classification; and applying the stored FCRF model for classification of the pair of contact center interactions candidates;

calculating an FCRF classification score representing the probability that a customer issue was not resolved within the first interaction of the pair of interactions, and handling of the same customer issue continued in the second interaction of the pair of interactions;

comparing the FCRF classification score to a predefined threshold, thereby classifying the pair of contact center interactions candidates as a first contact resolution failure (FCRF) interaction pair if the FCRF classification score is higher than the predefined threshold or classifying the pair of contact center interactions candidates as a first contact resolution (FCR) interactions pair if the FCRF classification score is lower than the predefined threshold; and generating a report including a list of pairs of interactions that were classified as FCRF pairs of interactions;

wherein the classification of the determined pair of contact center interactions comprises: determining based on the stored topic model a topic vector for each digital representation of the determined pair of digital representations; and determining a topic similarity score between the topic vectors associated with the interactions of the determined pair of digital representations.

15. The system according to claim 14, further comprising an additional analysis component configured to perform additional filtering of the contact center interactions.

16. The system according to claim 14, further comprising an FCRF search module configured to search for pairs of interactions classified as FCRF pairs of interactions.

17. The system according to claim 14, further comprising an FCRF search module configured to search for pairs of interactions classified as FCR pairs of interactions.

18. The system according to claim 14, further comprising an FCRF report component configured to generate a report comprising a list of pair of interactions classified as FCRF pairs of interactions.

19. The method according to claim 1, further wherein determining a topic similarity score is determined according to the formula:

$$TopicSim(\text{Pair}_i) = \left| \frac{T_i^A \times T_i^B}{\|T_i^A\| \times \|T_i^B\|} \right|$$

wherein:
i represents the i-th pair of interactions,
$T_i^A$ represents the topic vector of the first interaction of the i-th pair of interactions, and
$T_i^B$ represents the topic vector of the second interaction of the i-th pair of interactions.

20. The method according to claim 1, further comprising determining a mutual topic vector according to the formula:

$$MutualVec_i = (\text{clip}(T_i^A, Th)) \text{ AND } (\text{clip}(T_i^B, Th))$$

$$(\text{clip}(x, Th)) = \begin{cases} x_j = 1, & \text{if } (x_j > Th) \\ x_j = 0, & \text{otherwise} \end{cases}$$

wherein:
i represents the i-th pair of interactions,
$T_i^A$ represents the topic vector of the first interaction of the i-th pair of interactions,
$T_i^B$ represents the topic vector of the second interaction of the i-th pair of interactions,
$x_j$ represents the j-th entry of vector x,
Th represents a predefined threshold, and
AND represents a bitwise AND operation.

21. The method according to claim 1, further comprising generating a classification vector according to the formula CV(n):{[TS(n), MV(n), ED(n)]}, wherein:
n represents the n-th pair of interactions, TS(n) represents the topic similarity of the n-th pair,
MV(n) represents the mutual vector of the n-th pair, and
D(n) represents external data obtained for the n-th pair.

* * * * *